Sept. 20, 1932.   G. M. ARGABRITE   1,877,787
METHOD OF AND APPARATUS FOR STRETCHING LEATHER
Filed Feb. 21, 1930   5 Sheets-Sheet 1
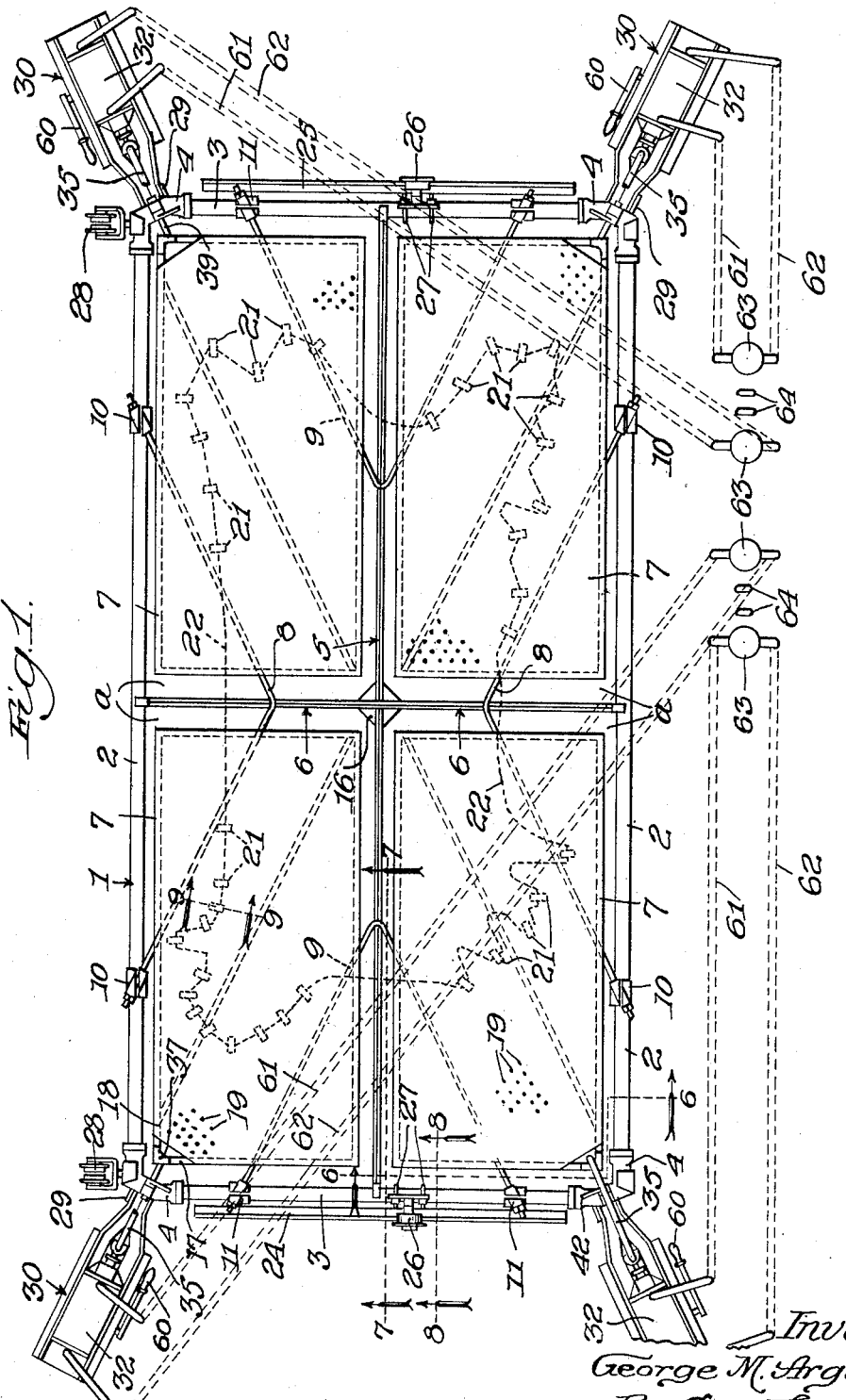

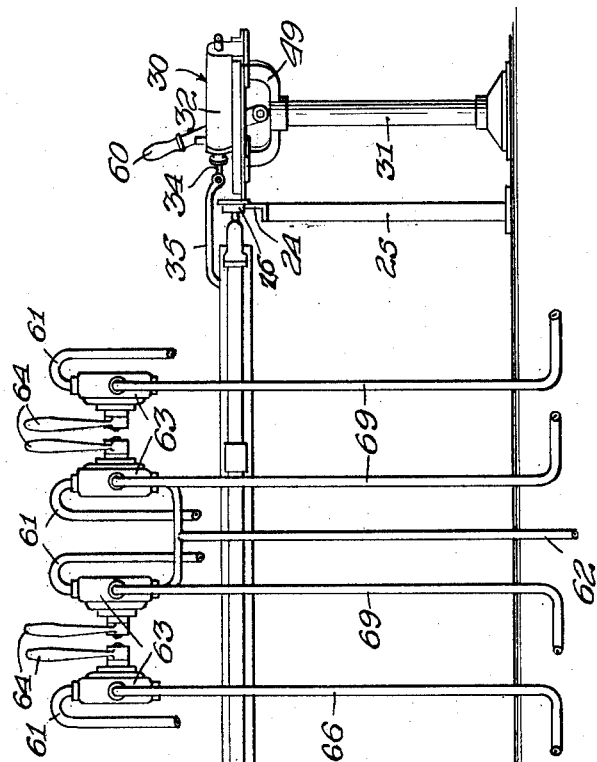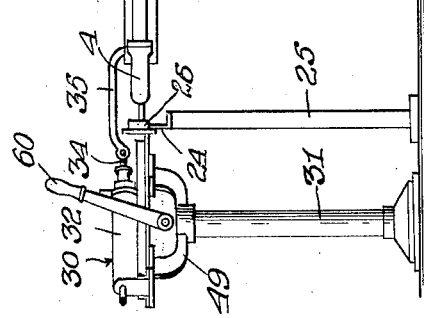

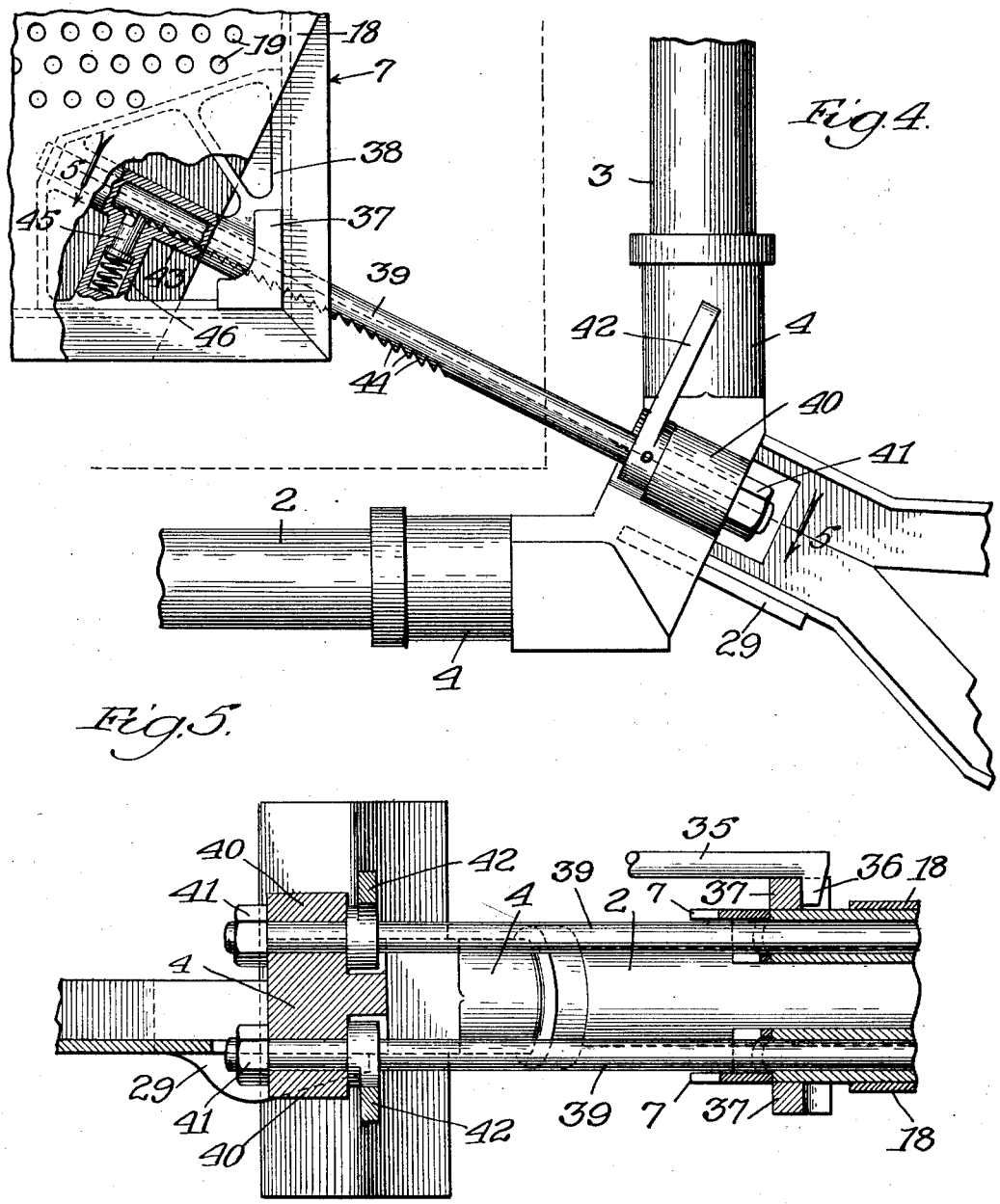

Sept. 20, 1932.   G. M. ARGABRITE   1,877,787
METHOD OF AND APPARATUS FOR STRETCHING LEATHER
Filed Feb. 21, 1930   5 Sheets-Sheet 4
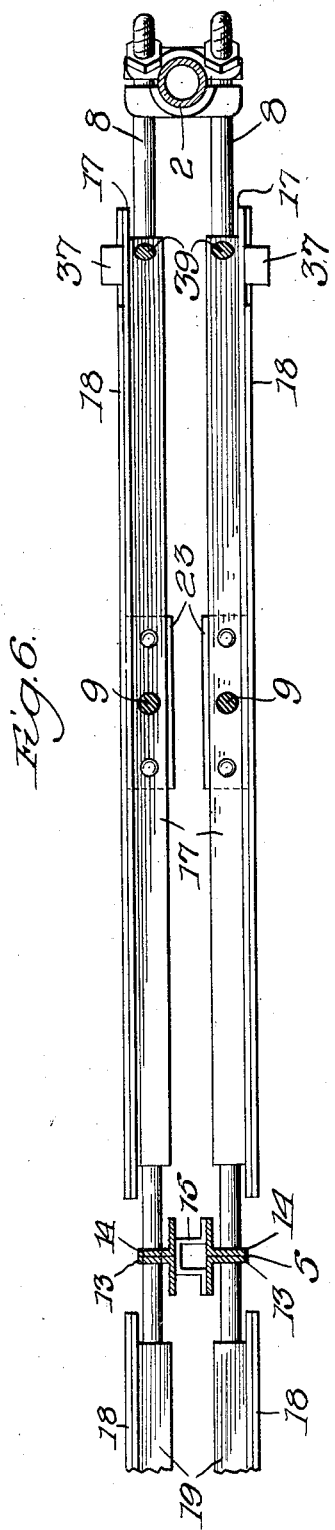
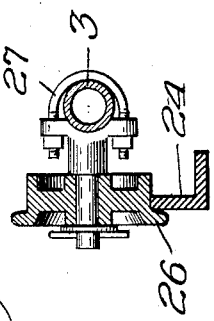
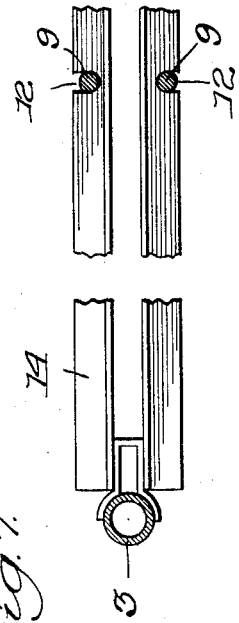
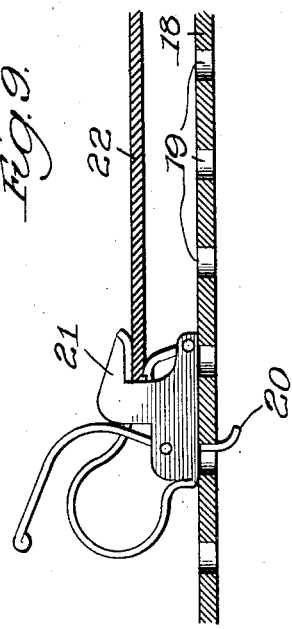
Inventor
George M. Argabrite,
By Eugene Curran
Att'y Sept. 20, 1932.                G. M. ARGABRITE                  1,877,787
              METHOD OF AND APPARATUS FOR STRETCHING LEATHER
                     Filed Feb. 21, 1930        5 Sheets-Sheet 5
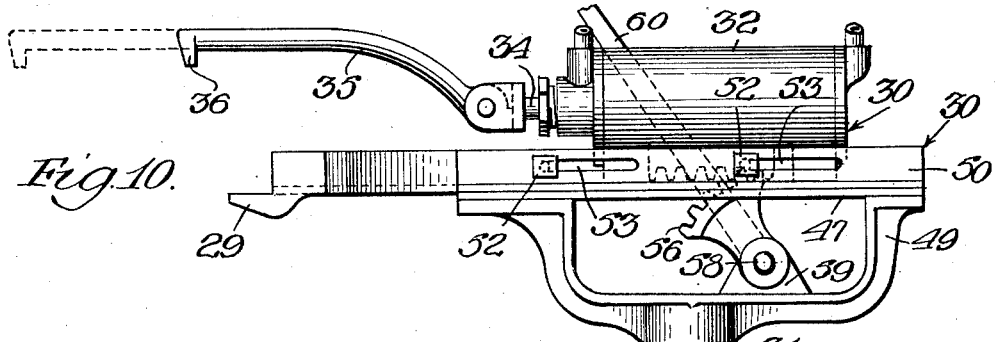
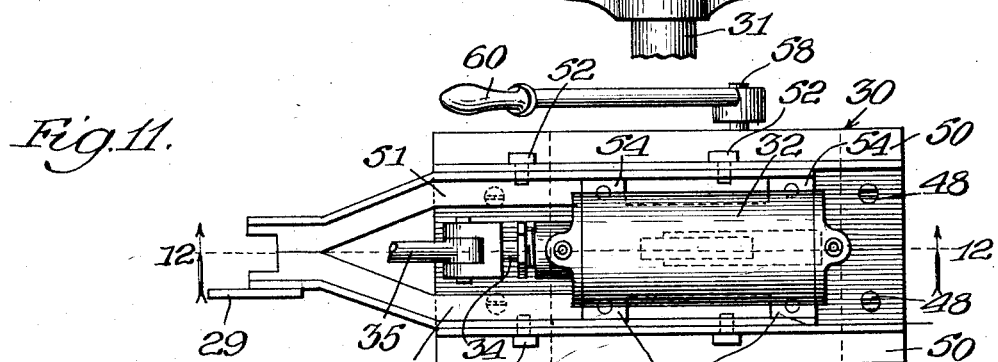
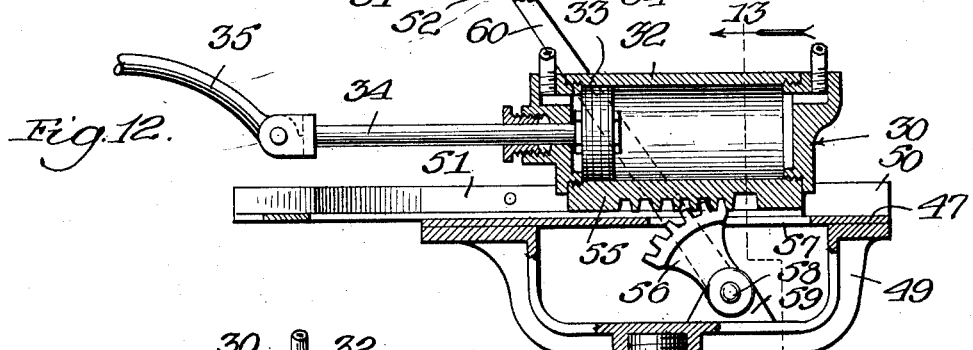
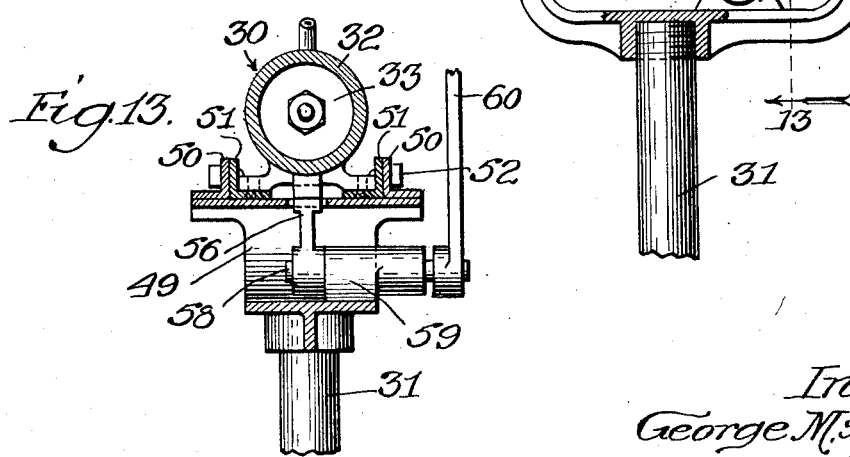
Inventor,
George M. Argabrite, Patented Sept. 20, 1932

1,877,787

UNITED STATES PATENT OFFICE

GEORGE M. ARGABRITE, OF CHICAGO, ILLINOIS, ASSIGNOR TO LEATHER EQUIPMENT CO., INC., OF CHICAGO, ILLINOIS, A CORPORATION OF ILLINOIS

METHOD OF AND APPARATUS FOR STRETCHING LEATHER

Application filed February 21, 1930. Serial No. 430,259.

This invention relates to a method of and apparatus for stretching leather, hides, pelts and other sheet like materials.

Heretofore, sides of hides have been stretched to increase the area thereof through the simultaneous movement of a number of auxiliary frames or carriers to which the hides are attached. The carriers are mounted in a main frame and mechanical means are employed operating at the center of the main frame to give simultaneous movement to the carriers in an oblique direction outwardly from the center of the main frame. Objection to this apparatus and method of stretching is that the auxiliary frames or carriers are not independently movable with respect to each other and consequently some portions of the hide cannot be stretched to a greater extent than others which may be required in actual practice.

An object of my invention is to provide means whereby the auxiliary frames or carriers may be moved either simultaneously or independently, that is, the auxiliary frames may be moved independently, thereby enabling different portions of the hide to be stretched to the extent desired.

Another object of my invention is to provide a main frame and have the auxiliary frames or carriers so mounted therein that the carriers may be given either simultaneous or independent movement.

Another object of my invention is to provide power operated means for giving movement to the auxiliary frames, there being a suitable motor for each auxiliary frame.

A further object of my invention is to provide means whereby the application of power to the several motors may be controlled from a single station and thus avoid the necessity of having an operator at each motor or going from motor to motor to operate them.

A further object of my invention is to provide the motors in the form of fluid actuated devices with valve means, one for each device, and grouped together, so that all of the valves are operable from a single station to control the movement of the carriers when stretching the material thereon.

The invention consists further in the matters hereinafter described and claimed.

In the accompanying drawings:

Fig. 1 is a plan view of a stretching apparatus constructed and arranged in accordance with my invention;

Fig. 2 is an elevational view of the structure shown in Fig. 1;

Fig. 3 is a diagrammatic view of the fluid actuated means and control means therefor, with parts in section;

Fig. 4 is a plan view, with parts in section, of a corner construction to be hereinafter described;

Fig. 5 is a longitudinal sectional view taken on line 5—5 of Fig. 4;

Figs. 6, 7, 8 and 9 are sectional views taken on lines 6—6, 7—7, 8—8, and 9—9, respectively, of Fig. 1;

Fig. 10 is a side view of one of the power units;

Fig. 11 is a plan view of the same;

Fig. 12 is a longitudinal sectional view taken on line 12—12 of Fig. 11; and

Fig. 13 is a transverse sectional view taken on line 13—13 of Fig. 12.

In Fig. 1, 1 indicates the main frame preferably formed of tubing and generally rectangular in shape and having side members 2, 2 and end members 3, 3, which are connected at the corners of the frame by couplings 4, 4. Extending centrally across the main frame 1 both longitudinally and transversely is a bracing structure of which 5 constitutes the longitudinal portion and 6 the transverse portion. These portions are connected together at the center of the frame where they meet, as shown in Fig. 1. Said portions 5, 6 divide the main frame into four rectangular sections a, a, of substantially the same size and shape.

Located in each section a are a pair of auxiliary frames or carriers 7, 7 of substantially the same shape as the section, but somewhat smaller in size so that the carriers may have movement in the section in the plane thereof. The carriers 7 are arranged on opposite sides of the frame, so that there is a set of four carriers on each side of the frame for the purpose to be hereinafter described. Each carrier 7 is slidably supported in its section on a pair of inclined rods 8, 9. These rods are arranged parallel and are supported by the bracing structure 5, 6 and the members 2, 3 of the main frame, as shown in Fig. 1. The rods 8, 9 are inclined outwardly from the bracing structure so that the carriers 7, 7 may be moved obliquely toward and from the center of the main frame.

The rods 8 have their outer ends secured to the side members 2, 2 of the main frame by clamps 10, 10, while similar clamps 11, 11 connect the outer ends of the rods 9 to the end members 3, 3 of the main frame. The inner ends of the rods 8, 8 are supported by the transverse portion 6 of the bracing structure, while the inner ends of the rods 9 are supported by the longitudinal portion 5 of said structure. The rods 8 and 9 on opposite sides of said bracing elements are preferably made in one piece sections and where they cross the adjacent bracing elements, the latter have notches 12 therein (Fig. 7) to receive and support the bend in the metal where the rods are joined. The bearing elements 5, 6 are preferably built up of angle sections 13, 14 secured together in back to back relation and with the notches 12 in the secured together flanges, as shown in Fig. 7. The angle sections 13, 14 of the portions 5, 6 of the bracing structure for one set of carriers 7 are spaced from the corresponding sections of the portions for the other set of carriers by a number of spacers interposed between them so that the portions 5, 6 for each set of carriers will be in proper position to support the rods for the carriers. In Fig. 6, I show one of the spacers 15. These are located near the ends of the structure where it is joined by welding or otherwise to the members 2, 3 of the main frame. A suitable spacer is located between the angle sections where they meet at the center of the main frame, and such structure is indicated generally by 16 in Fig. 1.

Each carrier 7 comprises a marginal frame 17 in angle form and arranged with one set of flanges in a plane parallel to the plane of movement of the carrier. A perforated plate 18 is secured to the outer side of these flanges and is co-extensive with the area of the frame, except for one corner, as hereinafter described. The perforations 19 in the plate 18 are regularly distributed over the surface of the plate, and serve to receive the lugs 20 on the clips or toggles 21, by means of which the side 22 of a hide is attached to a set of the carriers, as shown in Fig. 1. The clips 21 are arranged about the outer edge of the hide 22 and connect the same to all of the carriers in the set so that when the carriers are moved obliquely outward, the hide will be stretched as desired. The clips 21 are so made that the hide engaged thereby is maintained out of contact with the plates 18 so that a space is provided between the plates and the hide for the circulation of air between them when drying the hide either naturally or artificially as when the frame 1 with a hide thereon is placed in or run through the drying chamber of a drier apparatus. The other flanges of each carrier frame 17 extend inward, and are provided with openings for the rods 8, 9 to pass through. Plates 23 are secured to these flanges at the holes to provide relatively wide bearing surfaces for the rods.

When stretching a hide, the main frame 1 is disposed in a horizontal position, as shown in Figs. 1 and 2. The main frame is supported in raised position by a pair of rail sections 24, 25 on opposite sides of the main frame, said rail sections being exterior of the main frame and supported above the floor of the workroom by upright standards 25, 25 at the opposite ends of the sections. The main frame 1 is provided at its ends with flanged rollers 26, 26 for supporting the frame on said rails. The rollers are secured to the end members 3, 3 of the main frame by clamps 27, 27 (Fig. 8) which offset the rollers to one side of the longitudinal center line of the frame so as to give it more weight on one side of the rollers than on the other, thereby allowing the main frame to swing into a horizontal position when dropped on to the rail sections 14 from the overhead track-way from which the main frame is suspended in vertical position by hangers 28, 28 while traveling into, through and out of the drier apparatus. The hangers 28 are attached to the main frame at its opposite ends on one side, as shown in Fig. 1. The standards 25 support the rail sections 24 high enough so that the main frame can be swung about the axis of the rollers 26 to bring either set of carriers 7 on opposite sides of the main frame into uppermost position. The main frame 1 is supported in horizontal position by a number of stops 29, 29, one at each corner of the frame. These stops are carried by the power units to be now described.

To move the carriers 7, 7 of either set, simultaneously or independently for stretching hide attached thereto, I provide a plurality of power units 30, 30, one for each carrier and arranged at the corners of the main frame 1 when the latter is in stretching position, as shown in Fig. 1. The power units 30 are mounted in horizontal position on the upper ends of upright pedestals 31, 31, one for each unit. The pedestals 31 are secured to the floor of the workroom, and are so located that the units are exterior of the main frame 1. When of the fluid actuated type, as shown in the drawings, each unit has a cylinder 32, in which is a piston 33 having a piston rod 34 which extends through the end of the cylinder toward the main frame 1. A link 35 is pivoted to the outer end of each rod 34, and the free or outer end of the link is in the form of a hook 36 to be engaged over a rib 37 on a casting 38 carried by the cooperating carrier 7. The casting 38 fits within the corner of the carrier 7 beneath the plate 18, the latter being cut away at such corner to allow the rib 37 to extend above the plate, as shown in Figs. 4 and 5. The links 35 extend over the upper side of the main frame 1 to engage the uppermost set of carriers 7 and when motive fluid is supplied to the cylinders 32, the carriers will be moved inward or outward, as the case may be, depending on the direction in which the pistons 33 are moved in the cylinders.

When stretching the material attached to the carriers 7, the latter are moved obliquely outward on the rods 8, 9. To prevent the carriers from being drawn inward by the tension of the stretched material when the power is released from the carriers, and also when the links 35 are lifted therefrom, so as not to lose the benefit of the stretching operation, I provide ratchet means which will prevent the return of the carriers but will allow them to be moved outward as the power is applied thereto. The means referred to is provided at the corner of each carrier where the link is attached. Each means comprises a rod 39 obliquely arranged and in parallelism with the rods 8, 9. Rod 39 extends inward from the main frame 1 from the coupling 4 and has its outward end rotatably supported therein in a boss 40 provided for that purpose. A nut 41 is applied to the outer end of the rod 39 on the outer side of the boss and a handle member 42 is pinned to the rod on the inner side of the boss. The nut and handle member hold the rod against endwise movement. The inner portion of the rod 39 extends into the casting 38, and the latter has a tubular portion 43 to receive the rod and guide the carrier thereon in its inward and outward movement. The rod 39 is provided on one side with a series of ratchet teeth 44 with which engage a spring pressed pawl or plunger 45 in a tubular housing 46 in the casting 38. The housing 46 is arranged at right angles to the rod and opens into the tubular portion 43 so that the plunger may engage the rod and ratchet over the teeth thereon in the outward movement of the carrier 7. The teeth 44 are made to have inclined and straight faces, the latter being on the side of the teeth toward the main frame. The end of the plunger at the rod is reversely made so that the rod when engaged with said teeth will permit outward movement of the carrier but prevent inward movement thereof. To release the plunger 45 from the teeth of the rod 39 so that the carrier 7 may be moved inward to condition it for the beginning of a stretching operation, the rod is turned by the handle member 42 to present the smooth side of the rod to the plunger. The plunger and rod assembly described is duplicated at each of the four corners of the main frame 1, there being one of these assemblies for each carrier of each set. (See Fig. 5.)

Each power unit 30 has a stationary base plate 47 horizontally disposed and secured by screws 48 or otherwise to a U-shaped casting 49 on the upper end of the pedestal 31, as shown in Figs. 10 to 13. Angle strips 50, 50 are secured to the upper side of the plate 47 adjacent its side edges to provide a channel therebetween. The cylinder 32 is slidably mounted in this channel by the use of angle strips 51, 51 which rest on the base plate 47 and fit against the inner sides of the strips 50. Studs or screws 52, 52 are fixed to the strips 50 and extend into horizontal elongated slots 53, 53 in the strips 51, as shown in Fig. 10. The cylinder 32 is provided on its under side with lugs 54 by means of which the cylinder is attached to the strips 51, 51. The outer ends of the latter, that is, the ends toward the main frame 1, are brought together, as shown in Fig. 11, and the stop 29, heretofore referred to, is attached to one of these strips.

To move the cylinder 32 back and forth so as to adjust the stop 29 and the link 35 for engagement with the main frame 1 and carrier 7, respectively, I provide a rack 55 on the under side of the cylinder between the strips 51, 51. A segment gear 56 is in mesh with the rack, the base plate 47 being provided with an elongated slot 57 for the gear to engage the rack, as shown in Fig. 12. The gear is fixed to a rock shaft 58 journaled in one or more lugs 59 in the casting 49 and to one end of said shaft is fixed a handle member 60 for turning the shaft. The handle 60 is arranged at one side of the base plate 47 and extends upward past the same to be within reach of the operator.

When the main frame 1 is swung into horizontal position for a stretching operation, the cylinders 32 of the several power units 30 are moved inward by turning the handles 60 so as to bring the stops 29 under the couplings 4 at the corners of the main frame to support it in horizontal position. With the frame heavier on one side of the rollers 26 than at the other, the frame will remain against the stops without other fastening or holding means. With the links 35 extending over the upper end of the frame and engaging the uppermost carriers 7, the frame cannot be displaced out of its horizontal position. To release the frame so that it may be swung about the axis of the rollers 26 to bring the other set of carriers uppermost for stretching the hide thereon, the cylinders 32 are moved backward after the links are released. This withdraws the stops 29 from withunder the frame so that the latter may be turned over as required, whereupon the cylinders are again moved forward to position the stops under the frame as before.

Connected with each cylinder 32 are a pair of conduits 61, 62, which open into the opposite ends of the cylinder. These conduits lead to a control valve 63, one for each cylinder. Each valve is in the form of a turning plug having a handle 64 by which it may be turned. Each valve is provided with a pair of passages 65, 65a therein, as shown in Fig. 3. The valves 63 are arranged in a group close to each other, as shown in Fig. 2, so that all of the handles 64 are within reach of one operator, so that the power units 30 may be operated from a central station.

The motive fluid for the cylinders 32 is supplied through valves 63 by means of a supply pipe 66, which is connected to a suitable source of motive fluid supply, such as a tank or a compressor, if the motive fluid is in the form of compressed air. The pipe 66 leads to an intake opening 67 in the casing 68 of one of the valves 63. Branches 69, 69 connect pipe 66 with the intake ports 67 of each of the other valves 63, as shown in Fig. 3. Each valve 63 is provided with an exhaust port 70, each connecting with one of the exhaust pipes 71. The conduits 61, 62 connect with the valve 63 on opposite sides of the intake and exhaust ports 67, 70 of the valve as shown in Fig. 3.

When the turning plugs of the valves 63 are in position shown in Fig. 3, the motive fluid is supplied to the cylinders 32 through the conduits 61 and the exhaust from the cylinders is through the conduits 62 and 71. At this time all of the pistons 33 are moved in the same direction and simultaneously, thereby moving the carriers 7 of the set connected with the pistons in the same direction and simultaneously. On turning the plugs into the position indicated by the dotted lines in Fig. 3, the motive fluid is then supplied to the cylinders through conduits 62 and the pistons are moved simultaneously in the opposite direction to impart a like movement to the carriers providing the ratchet means is released therefrom. This operation is performed when it is desired to return the carriers 7 to the start of a stretching position after a hide, which has been stretched, has been released therefrom.

By manipulating each turning plug 63 separately the carrier 7, controlled thereby, may be moved independently of the other carriers and thus the portion of the hide attached to such carrier may be stretched to a greater extent than the portions of the hide attached to the other carriers. By manipulating two of the valves, the two carriers controlled thereby may be moved simultaneously but independently of the other two carriers and the portions of the hide attached to the first mentioned carriers may be stretched to a much greater extent than the portions of the hide attached to the last mentioned carriers. It is apparent that by having a control valve for each cylinder, the carriers may be moved independently or they may be moved simultaneously. In this way the hide attached to the carriers may be stretched to the extent required and the stretching of one portion of the hide may be greater than another portion merely by manipulating the valves to control the movement of the respective carriers.

With my invention the stretching action is within the control of the operator, and the hide may be stretched to the extent desired over all portions thereof, because the stretching mechanism is not limited or restricted to a uniform movement of all of the carriers, as is the case with the devices heretofore employed, wherein the carriers are not movable independently, but must be moved simultaneously, either outward or inward, as the case may be, and to the same extent with respect to all of the carriers.

With my invention the mechanism for moving the carriers is exterior of the main frame and constitutes no part of the same, thereby making the main frame cheaper to construct and maintain, because it has no mechanical parts which control the movement of the carriers, as in the structures heretofore employed. With the power operated mechanism independent of the main frame, such mechanism may be used with all frames without duplicating the mechanism for each frame. This saves expense, both as to manufacture of the mechanism and its installation, and moreover, permits all of the frames to be used, because there is not that likelihood of the stretching mechanism becoming inoperative and thus throwing a frame out of use as is the case when the stretching mechanism is embodied in the structure of the frame itself. Moreover, with a set of carriers 7, 7 on opposite sides of the main frame 1, the latter may support two hides at one time, and with the carriers of one set mounted for movement independently of those of the other set, the two hides may be stretched while the frame is at the stretching station. This doubles the capacity of the frame and thus increases the output of the plant using the frames.

The details of structure and arrangement of parts shown and described may be variously changed and modified without departing from the spirit and scope of my invention.

I claim as my invention:

1. An apparatus for stretching leather or other sheet like materials embodying a frame, means within the frame for supporting a plurality of carriers to which the material to be stretched is attached, said carriers being arranged for movement toward and from each other in the same plane and in a plurality of directions, and adapted to be engaged by means whereby the carriers may be moved either simultaneously or independently in such directions.

2. An apparatus for stretching leather or other sheet like materials, embodying a frame, means within the frame for supporting a plurality of carriers to which the material to be stretched is attached, said carriers being arranged for movement toward and from each other in the same plane, and adapted to be engaged by means exterior of the carriers whereby they may be moved independently.

3. An apparatus for stretching leather or other sheet like materials, comprising a main frame, a plurality of carriers mounted within the main frame and arranged for movement toward and from each other in the same plane and obliquely from a common center within the main frame, means whereby the material to be stretched may be attached to the carriers, the carriers being adapted to be engaged by means whereby they may be moved either simultaneously or independently.

4. An apparatus for stretching leather or other sheet like materials, comprising a main frame, two sets of carriers mounted within the main frame and arranged on opposite sides thereof, each set of carriers consisting of a plurality of carriers movable toward and from each other in the same plane and in a plurality of directions, means whereby the materials to be stretched may be attached to the carriers of each set, the carriers of either set being adapted to be engaged by means whereby they may be moved independently of each other in such directions.

5. An apparatus for stretching leather or other sheet like materials, comprising a main frame, two sets of carriers mounted within the main frame and arranged on opposite sides thereof, each set of carriers consisting of a plurality of carriers movable toward and from each other in the same plane and in a plurality of directions, means whereby the materials to be stretched may be attached to the carriers of each set, said carriers being adapted to be engaged by means exterior of the main frame whereby they may be moved independently or simultaneously.

6. In an apparatus for stretching leather or other sheet like materials, embodying a plurality of carriers arranged for movement toward and from each other in the same plane, and in a plurality of directions, and whereon material to be stretched may be attached, power operated means, one for each carrier, and means for controlling the application of power to the power operated means whereby the carriers may be moved independently.

7. In an apparatus for stretching leather or other sheet like materials, embodying a plurality of carriers arranged for movement toward and from each other in the same plane and in a plurality of directions, and including means whereby material to be stretched may be attached to each of the carriers, fluid operated motors, one for each carrier adapted to be engaged therewith for moving the same, and valve means for controlling the application of motive fluid to said motors whereby the carriers may be moved either simultaneously or independently.

8. In an apparatus for stretching leather or other sheet like materials, comprising a main frame, a plurality of carriers mounted within the main frame and arranged for movement toward and from each other in the same plane and in a plurality of directions, and including means whereby the material to be stretched may be attached to the carriers, power operated means, one for each carrier and arranged to engage the carriers at the corners of the main frame when the latter is in stretching position, and means for controlling the application of power to said power operated means whereby the carriers may be moved either simultaneously or independently.

9. In an apparatus for stretching leather or other sheet like materials, embodying a plurality of carriers arranged for movement toward and from each other in the same plane, and including means whereby the material to be stretched may be attached to the carriers, fluid operated devices, one for each carrier and adapted to be connected therewith to move the same, and valve means, one for each of said devices, for controlling the flow of motive fluid to and from the same, the valve means for all of the devices being grouped together for operation from a single station.

10. An apparatus for stretching leather or other sheet like materials, comprising a main frame rectangular in form, means dividing the main frame longitudinally and transversely into a plurality of open sections, a plurality of carriers, one in each section, means slidably mounting the carriers in the respective sections and permitting movement of the carriers obliquely in the same plane toward and from the center of the main frame, means whereby the material to be stretched may be attached to all of the carriers, said carriers being adapted to be engaged by means whereby they may be moved either simultaneously or independently.

11. An apparatus for stretching leather or other sheet like materials, comprising a main frame, a plurality of carriers mounted within the main frame and arranged for movement toward and from each other in the same plane, means for attaching material to be stretched to each of the carriers and in a plurality of directions, the carriers being adapted to be moved from each other in such directions to stretch the material attached thereto, and means for preventing inward movement of the carriers under the tension of the stretched material thereon.

12. An apparatus for stretching leather or other sheet like materials, comprising a main frame, a plurality of carriers mounted within the main frame and movable toward and from each other in the same plane and in a plurality of directions, means whereby the material to be stretched may be attached to said carriers, the carriers being adapted to be moved from each other to stretch the material attached thereto in such directions, rods carried by the main frame, one for each carrier, said rods having ratchet teeth, and spring pressed plungers carried by the carriers and engageable with the teeth of the rods to prevent inward movement of the carriers under the tension of the stretched material thereon.

13. In an apparatus for stretching leather or other sheet like materials, comprising a main frame, a plurality of carriers mounted within the main frame and arranged for movement toward and from each other in the same plane, and including means whereby the material to be stretched may be attached to said carriers, power operated devices exterior of the main frame, one for each carrier adapted to engage therewith, each device having a link to be extended across the main frame and engage the associated carrier, and means for controlling the application of power to said devices whereby the carriers may be moved to stretch the material attached thereto.

In testimony whereof I affix my signature.

GEORGE M. ARGABRITE.

CERTIFICATE OF CORRECTION.

Patent No. 1,877,787.   September 20, 1932.

GEORGE M. ARGABRITE.

It is hereby certified that error appears in the printed specification of the above numbered patent requiring correction as follows: Page 5, lines 129 and 130, claim 11, strike out the words "and in a plurality of directions" and insert the same to follow the word "plane" in line 127; and that the said Letters Patent should be read with this correction therein that the same may conform to the record of the case in the Patent Office.

Signed and sealed this 29th day of November, A. D. 1932.

(Seal)

M. J. Moore,
Acting Commissioner of Patents.